(12) United States Patent
Qiu et al.

(10) Patent No.: US 8,274,659 B2
(45) Date of Patent: Sep. 25, 2012

(54) RESONATOR FIBER OPTIC GYROSCOPES WITH REDUCED ROTATION RATE INSTABILITY FROM BACK REFLECTIONS

(75) Inventors: Tiequn Qiu, Glendale, AZ (US); Lee K. Strandjord, Tonka Bay, MN (US); Glen A. Sanders, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 66 days.

(21) Appl. No.: 12/871,518

(22) Filed: Aug. 30, 2010

(65) Prior Publication Data

US 2012/0050745 A1 Mar. 1, 2012

(51) Int. Cl.
*G01C 19/72* (2006.01)
(52) U.S. Cl. ........................................... 356/460
(58) Field of Classification Search ........... 356/459–476
See application file for complete search history.

(56) References Cited

U.S. PATENT DOCUMENTS

| | | | |
|---|---|---|---|
| 4,674,881 A * | 6/1987 | Lawrence et al. | 356/461 |
| 5,090,810 A * | 2/1992 | Malvern | 356/461 |
| 5,157,461 A | 10/1992 | Page | |
| 5,296,912 A | 3/1994 | Strandjord et al. | |
| 5,325,174 A * | 6/1994 | Danko | 356/461 |
| 6,014,217 A | 1/2000 | Sanders et al. | |
| 7,372,574 B2 | 5/2008 | Sanders et al. | |
| 7,463,360 B2 | 12/2008 | Hughes et al. | |
| 7,486,401 B2 | 2/2009 | Sanders | |
| 7,522,284 B2 | 4/2009 | Sanders et al. | |
| 7,697,143 B2 | 4/2010 | Sanders et al. | |
| 7,751,055 B2 | 7/2010 | Sanders et al. | |
| 2009/0296098 A1* | 12/2009 | Sanders et al. | 356/461 |
| 2010/0002239 A1 | 1/2010 | Strandjord et al. | |
| 2010/0128277 A1 | 5/2010 | Qiu et al. | |

\* cited by examiner

*Primary Examiner* — Hwa Lee
(74) *Attorney, Agent, or Firm* — Fogg & Powers LLC

(57) ABSTRACT

A resonator fiber optic gyroscope (RFOG) is disclosed that reduces rotation rate error instability. In one embodiment, the RFOG comprises a resonator optical ring cavity, a first light source in optical communication with the ring cavity and configured to generate a clockwise optical signal, and a second light source in optical communication with the ring cavity and configured to generate a counter-clockwise optical signal. The RFOG also includes a first optical component in optical communication with the first light source and the ring cavity. The first optical component is configured to prevent the clockwise optical signal from being back-reflected to the first light source. A second optical component is in optical communication with the second light source and the ring cavity. The second optical component is configured to prevent the counter-clockwise optical signal from being back-reflected to the second light source. In addition, a first optical detector and a second optical detector are optically coupled to the ring cavity.

13 Claims, 10 Drawing Sheets

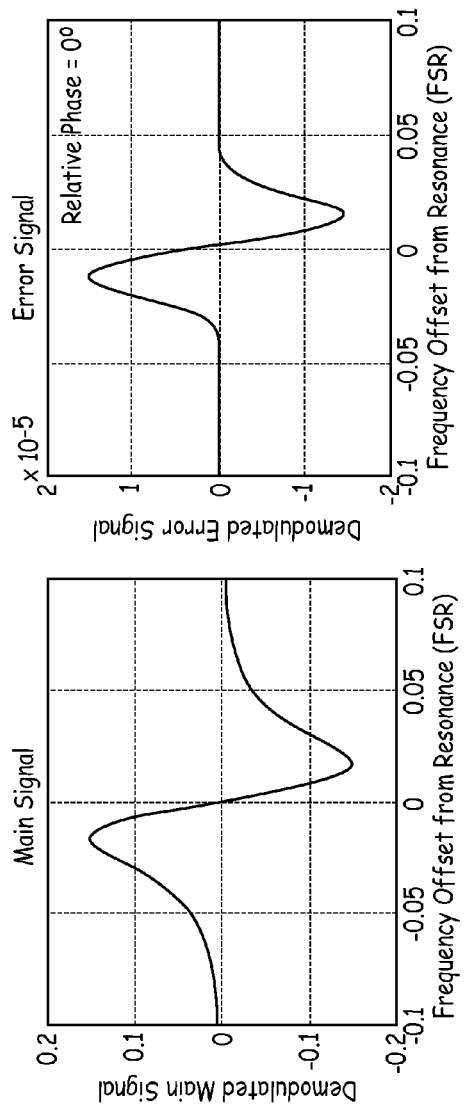
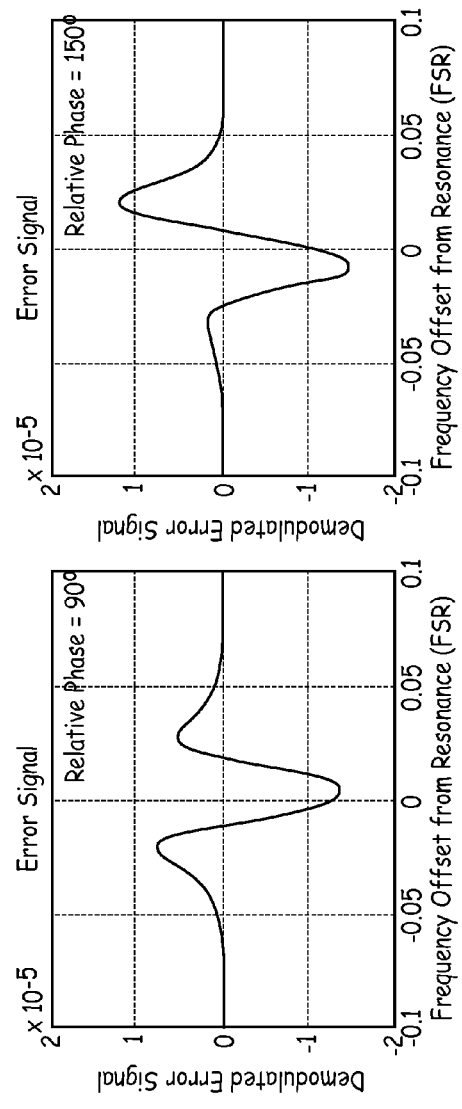
FIG. 5A
FIG. 5B
FIG. 5C
FIG. 5D

RESONATOR FIBER OPTIC GYROSCOPES WITH REDUCED ROTATION RATE INSTABILITY FROM BACK REFLECTIONS

STATEMENT REGARDING FEDERALLY SPONSORED RESEARCH OR DEVELOPMENT

This invention was made with Government support under Contract No. FA9453-08-C-0263 awarded by the Air Force Research Laboratory (AFRL). The Government has certain rights in the invention.

BACKGROUND

A resonator fiber optic gyroscope (RFOG) is a sensing apparatus that senses rotation rates by measuring rotation induced resonance frequency difference of the RFOG ring cavity in two counter-propagating directions (referred herein as clockwise (CW) and counter-clockwise (CCW) directions). In order to measure the ring cavity resonance frequency difference, monochromatic lightwaves from separately tunable lasers are typically phase modulated and then coupled into the RFOG ring cavity in CW and CCW directions. A fraction of the circulating lightwaves are coupled out of the ring cavity and directed to photodetectors to generate photocurrent (or voltage) signals. Demodulation of the photodetector signal at the corresponding phase modulation frequencies generates discriminant signals for detection of the resonance frequency difference of CW and CCW directions.

Ideally, CW and CCW propagating lightwaves are received by separate detectors (referred to herein as CW and CCW detectors, respectively) and no cross-coupling happens, that is, no CW (CCW) lightwaves are received by the CCW (CW) detector. In practical situations, however, there are imperfect optical surfaces in the ring cavity that may weakly reflect lightwaves into the counter-propagating direction, causing fractions of the CW (CCW) beam to be received by the CCW (CW) photodetector. This back reflection is often categorized as of "single-back-reflection" type, because it is characterized by directing lightwaves onto wrong detectors through one (or odd number of) reflection(s). Using different phase modulation frequencies for the CW and CCW resonance detection is an effective way to isolate the erroneous reflected signal.

In the case when CW and CCW lightwaves have nearly the same optical frequency, the interference beat signal falls within the gyro bandwidth, causing signal fluctuations that can significantly degrade the gyro performance. To solve this problem, schemes have been previously suggested to use multiple laser beams in the CW and CCW direction in such a way that their frequencies are separated by integer numbers of resonator free spectral range (FSR), which is the frequency separation between neighboring resonances, typically, a few to a few hundred MHz. Since the beat noise frequencies are in the high frequency region, such frequencies can be filtered out by low-pass electronic filters.

There is another type of reflection called "double-back-reflection" (or simply "double reflection") whose impact on the stability of rotation rate measurement (also called rotation rate stability) cannot be easily removed by the above mentioned methods. Double reflections cause lightwaves to interfere with the reflected portion of themselves produced by two (or even number) of reflections in the optical path. For this type of back reflection, the interfering lightwaves are originated from the same laser, having the same optical frequency and the same phase modulation. The interfering lightwaves cannot be easily isolated from the main signal beam in the demodulation process. The erroneous lightwaves, which are turned into a counter-propagating direction through a first reflection point and then turned back into the original direction by a second reflection point, propagate through a different optical path as the main beam. Environmentally induced path length variation causes the relative phase changes between the two interfering beams, leading to rotation rate instability of the gyroscope. This can be a significant factor that degrades RFOG performance.

SUMMARY

The invention relates to a resonator fiber optic gyroscope (RFOG) that reduces rotation rate error instability. In one embodiment, the RFOG comprises a resonator optical ring cavity, a first light source in optical communication with the ring cavity and configured to generate a clockwise optical signal that is transmitted to the ring cavity, and a second light source in optical communication with the ring cavity and configured to generate a counter-clockwise optical signal that is transmitted to the ring cavity. The RFOG also includes a first optical component in optical communication with the first light source and the ring cavity. The first optical component is configured to prevent the clockwise optical signal from being back-reflected to the first light source. A second optical component is in optical communication with the second light source and the ring cavity. The second optical component is configured to prevent the counter-clockwise optical signal from being back-reflected to the second light source. In addition, a first optical detector and a second optical detector are optically coupled to the ring cavity.

DRAWINGS

The drawings depict only representative embodiments of the invention and are not to be considered limiting in scope. These embodiments will be described with additional specificity and detail in the following description through the use of the referenced drawings, in which:

FIG. 5A is a graph of an exemplary demodulated main signal as a function of laser frequency deviation from cavity resonance frequency in units of free spectral range for an RFOG;

FIGS. 5B-5D are graphs of exemplary error signals at three different relative phases, indicating instability caused by double reflections in an RFOG;

DETAILED DESCRIPTION

Figure 1:
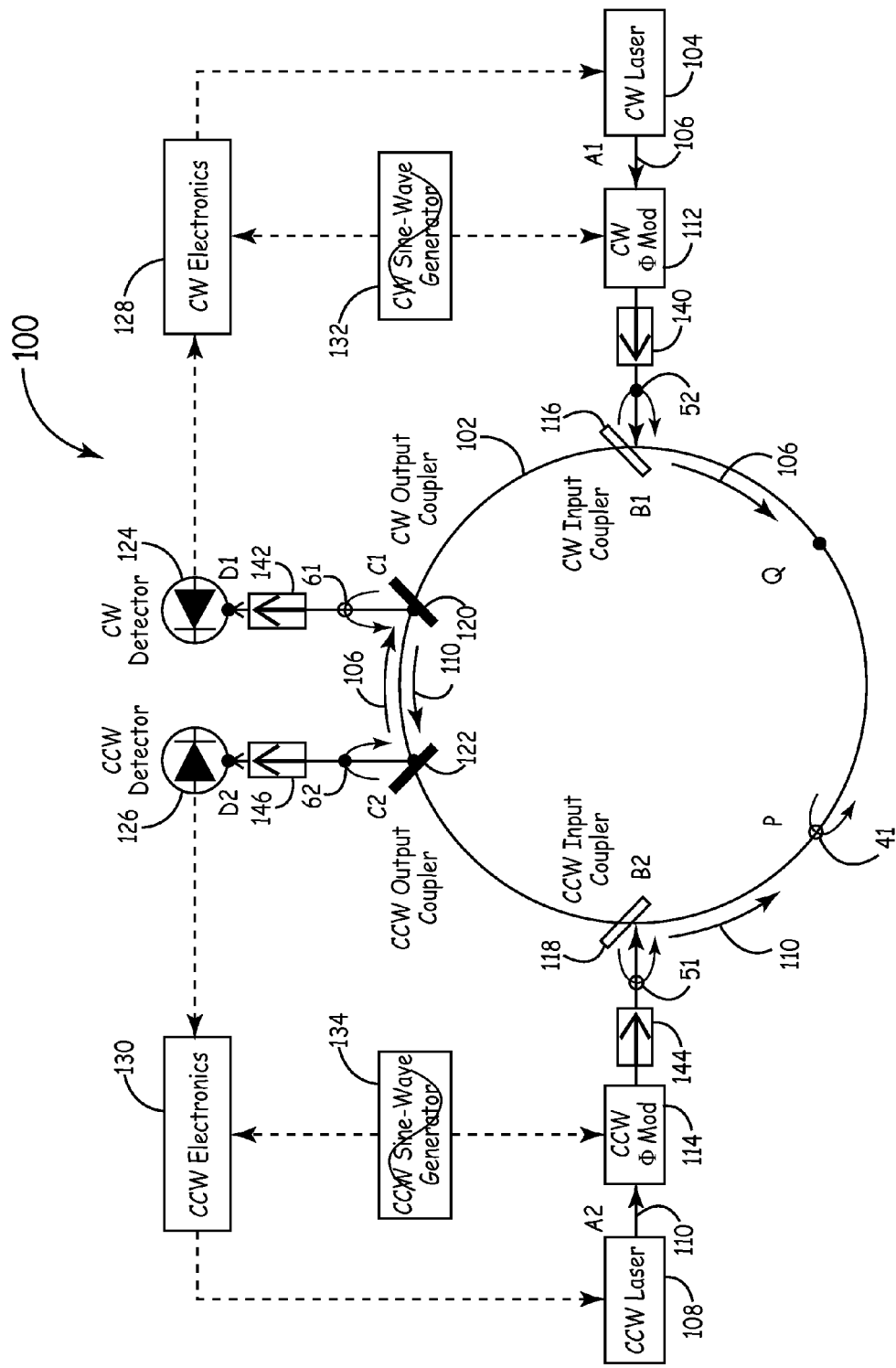
FIG. 1 is a block diagram of a resonator fiber optic gyroscope (RFOG) according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

The present invention relates to apparatus and methods for reduction of rotation rate instability in a resonator fiber optic gyroscope (RFOG) caused by back reflections. The apparatus and methods mitigate rotation rate errors (rotation rate errors) in order to improve RFOG performance for high-end applications.

One problem of conventional RFOGs in achieving required performance levels is double backscatter or double back reflections within the resonant ring, which introduces a rotation rate error in rotation sensing. The cause of this error is from the interference of the main light beam with the double reflected part of itself that has a different optical path. Any variation of the optical path due to environmental instabilities causes the interference signal to vary, leading to rotation rate error instabilities.

A reduction in rotation rate instability due to back reflections can be accomplished using two methods. In the first method, the rotation rate error cancellation effects of the clockwise (CW) and counter-clockwise (CCW) signals are improved by using CW and CCW lightwaves with as close to identical properties as possible. These properties can include phase modulation frequency, modulation amplitude, linewidth, signal demodulation phases, and the like. The second method modulates one of the above mentioned properties of the CW lightwave with respect to the CCW lightwave (or vice versa) so that the rotation rate oscillates around a value corresponding to zero back-reflection. Averaging of the oscillating rotation rate error can reduce or eliminate the instability due to reflection in the RFOG ring cavity.

In order to implement the first method, an RFOG is utilized with a highly symmetric configuration for CW and CCW lightwaves to effectively cancel the rotation rate errors induced by back reflections. The laser beams used for the CW and CCW lightwaves have close to identical optical properties such as linewidth, powers, and are modulated with the same kind of modulators with substantially the same modulation amplitudes and modulation frequencies (although a small difference may be required for reducing cross-talk between CW and CCW signals). In addition, the CW and CCW detector signals are demodulated at substantially the same phases. In this way, the rotation rate errors of CW and CCW can be effectively canceled and reduced by a few orders of magnitude.

In order to implement the second method, one of the laser properties is modulated relative to the other. For example, a slow small sinusoidal modulation of the phase modulation amplitude of CW light with respect to the fixed CCW phase modulation amplitude (or vice versa) will produce sinusoidal rotation rate error variations. The mean value of the variation corresponds to the zero back reflection rotation rate error that can be obtained after averaging the signals. Modulation of other parameters such as phase modulation frequency or demodulation phase can also be utilized.

The present methods and apparatus provide a significant reduction of back reflection induced rotation rate errors. A theoretical model is described hereafter that quantifies the back reflection induced rotation rate errors and the level of rotation rate error cancellation effects.

Further details of the present method and system are described hereafter with reference to the drawings. It should be understood that the terms lightwave, laser beam, light beam, light, and optical signal are used interchangeably herein.

FIG. 1 illustrates a resonator fiber optic gyroscope (RFOG) 100 according to one embodiment. The RFOG 100 generally includes a resonator optical ring cavity 102, which can be a fiber optic coil wound around a core and about an axis around which rotation is sensed. A first light source 104, such as a laser, is in optical communication with ring cavity 102 is and configured to generate a clockwise (CW) optical signal 106 that is transmitted to ring cavity 102. A second light source 108, such as a laser, is also in optical communication with ring cavity 102 and is configured to generate a counter-clockwise (CCW) optical signal that is transmitted to ring cavity 102.

The RFOG 100 also includes a first optical phase modulator 112 located along an optical path between light source 104 and ring cavity 102, with phase modulator 112 configured to modulate the CW optical signal from light source 104. A second optical phase modulator 114 is located along an optical path between light source 108 and ring cavity 102, with phase modulator 114 configured to modulate the CCW optical signal from light source 108.

A first input coupler 116 is configured to couple the CW optical signal from light source 104 into ring cavity 102, and a second input coupler 118 is configured to couple the CCW optical signal from light source 108 into ring cavity 102. A first output coupler 120 is configured to couple the CW optical signal from ring cavity 102 to a first optical detector 124, a second output coupler 122 is configured to couple the CCW optical signal from ring cavity 102 to a second optical detector 126. The optical detectors 124, 126 can be photodetector/preamps, which convert the optical signals to voltage signals.

An electronics device 128 demodulates the output voltage signal from optical detector 124, and an electronics device 130 demodulates the output voltage signal from optical detector 126. The electronics device 128 provides feedback to light source 104 to lock its frequency to the CW resonance of ring cavity 102. Likewise, electronics device 130 provides feedback to light source 108 to lock its frequency to the CCW resonance of ring cavity 102.

A sine wave generator 132 provides a modulation voltage to phase modulator 112, and provides a reference frequency to electronics device 128 for demodulation of signals. Likewise, a sine wave generator 134 provides a modulation voltage to phase modulator 114, and provides a reference frequency to electronics device 130 for demodulation of signals. The output signals from electronics devices 128, 130 may be processed by a central control unit (not shown) to respectively determine the CW and CCW resonance frequency difference so that rotation rates can be measured.

A first optical component 140 is in optical communication with light source 104 and ring cavity 102. The optical component 140 is configured to prevent the CW optical signal from being back-reflected to light source 104. A second optical component 144 is in optical communication with light source 108 and ring cavity 102. The optical component 144 is configured to prevent the CCW optical signal from being back-reflected to light source 108. The optical components 140, 144 can be optical isolators, which allow the transmission of light in only one direction and prevent light from being back-reflected.

A third optical component 142 is located between output coupler 120 and optical detector 124. The third optical component 142 is configured to prevent the CW optical signal from being back-reflected to ring cavity 102. A fourth optical component 146 is located between output coupler 122 and optical detector 126. The optical component 146 is configured to prevent the CCW optical signal from being back-reflected to ring cavity 102. The optical components 142, 146 can also be optical isolators, In order to categorize and characterize the back-reflection induced rotation rate errors, several potential back-reflection locations are indicated in FIG. 1 by bending arrows with either open or filled small circles. The bending arrow indicates the direction of back reflection. The arrows with open circles (e.g., 41, 51 and 61) label the points that reflect CW light 106 into the CCW direction for the first encountered reflection. The arrows with filled circles (e.g., 42, 52 and 62) label the points that reflect CCW light 110 into the CW direction for the first encountered reflection. Reflection points 41 and 42 are located inside the ring cavity. Reflection points 51 and 52 are respectively located on the optical input paths between isolator 144 and input coupler 118, and between isolator 140 and input coupler 116. Reflection points 61 and 62 are respectively located on the optical output paths between isolator 142 and output coupler 120, and between isolator 146 and output coupler 122. The foregoing reflection points are examples of possible reflection points in the RFOG optical path that can degrade gyroscope performance.

While FIG. 1 depicts a general configuration for one embodiment of an RFOG, in other embodiments the functions of input and/or output coupling of CW and/or CCW lightwaves into and/or out of the ring cavity can be implemented by a reduced number of couplers.

Figure 2:
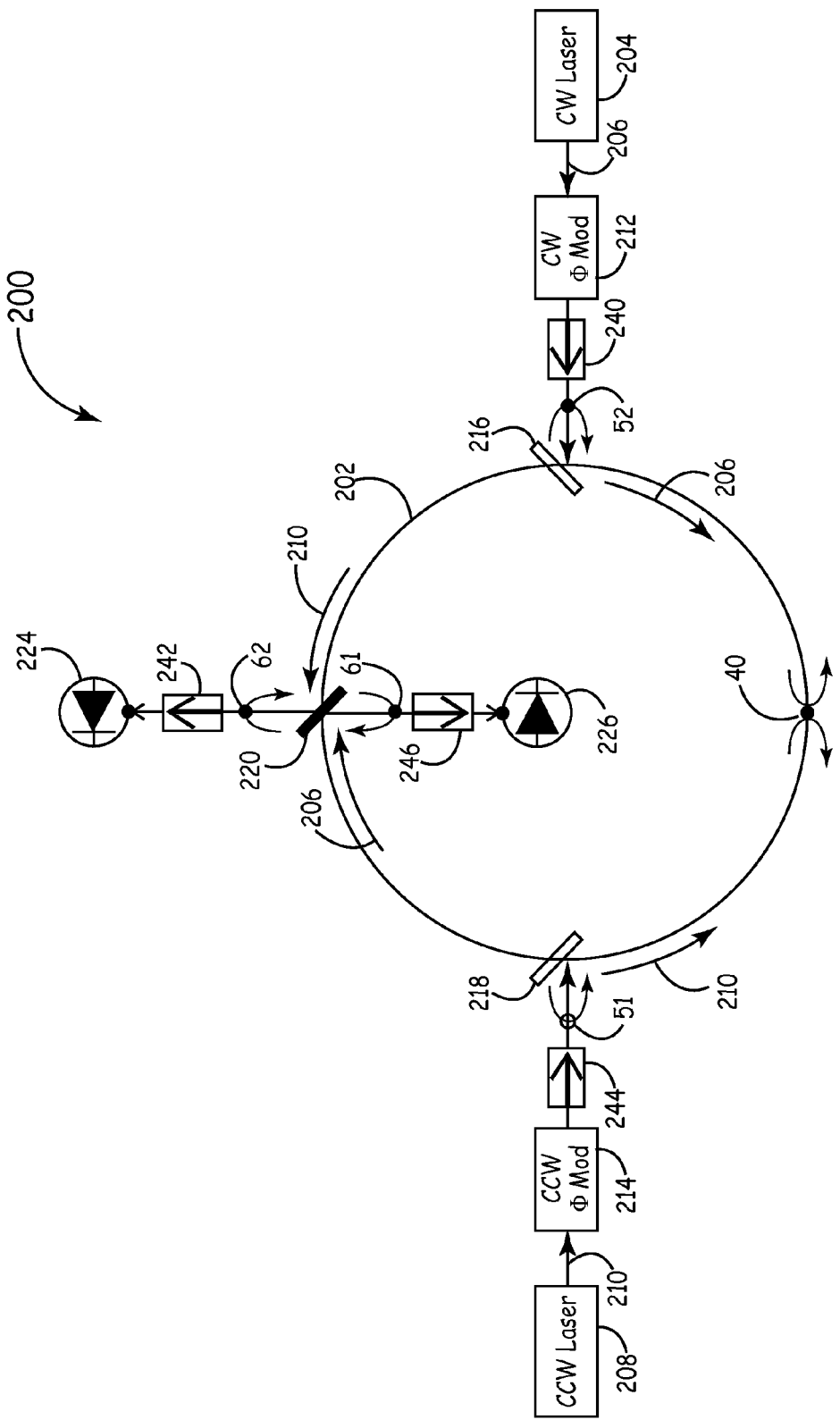
FIG. 2 is a block diagram of an RFOG according to another embodiment.

For example, FIG. 2 illustrates an RFOG 200 according to another embodiment, which includes similar components as RFOG 100, including a resonator optical ring cavity 202, such as a fiber optic coil. A laser 204 generates a CW lightwave 206, and a laser 208 generates a CCW lightwave 210. The RFOG 200 also includes an optical phase modulator 212 for modulation of CW lightwave 206, and an optical phase modulator 214 for modulation of CCW lightwave 210. An optical input coupler 216 is configured to couple each CW lightwave into ring cavity 202, and an optical input coupler 218 is configured to couple each CCW lightwave into ring cavity 202.

The RFOG 200 has a single output coupler 220 to couple both CW lightwaves and CCW lightwaves out of ring cavity 202. The RFOG 200 further includes an optical detector 224, such as a photodetector, for receiving each CW output lightwave from ring cavity 202, and an optical detector 226, such as a photodetector, for receiving each CCW output lightwave from ring cavity 202. The optical detector 224 receives each CCW output lightwave from output coupler 220. The optical detector 226 receives each CW output lightwave from output coupler 220.

An optical isolator 240 prevents light from being back-reflected to laser 204, and an optical isolator 246 prevents light from being back-reflected to ring cavity 202 for the CW light. Likewise, an optical isolator 244 prevents light from being back-reflected to laser 208, and an optical isolator 242 prevents light from being back-reflected to ring cavity 202 for the CCW light. The RFOG 200 can also comprise additional electronics devices such as those described previously for RFOG 100.

Figure 3:
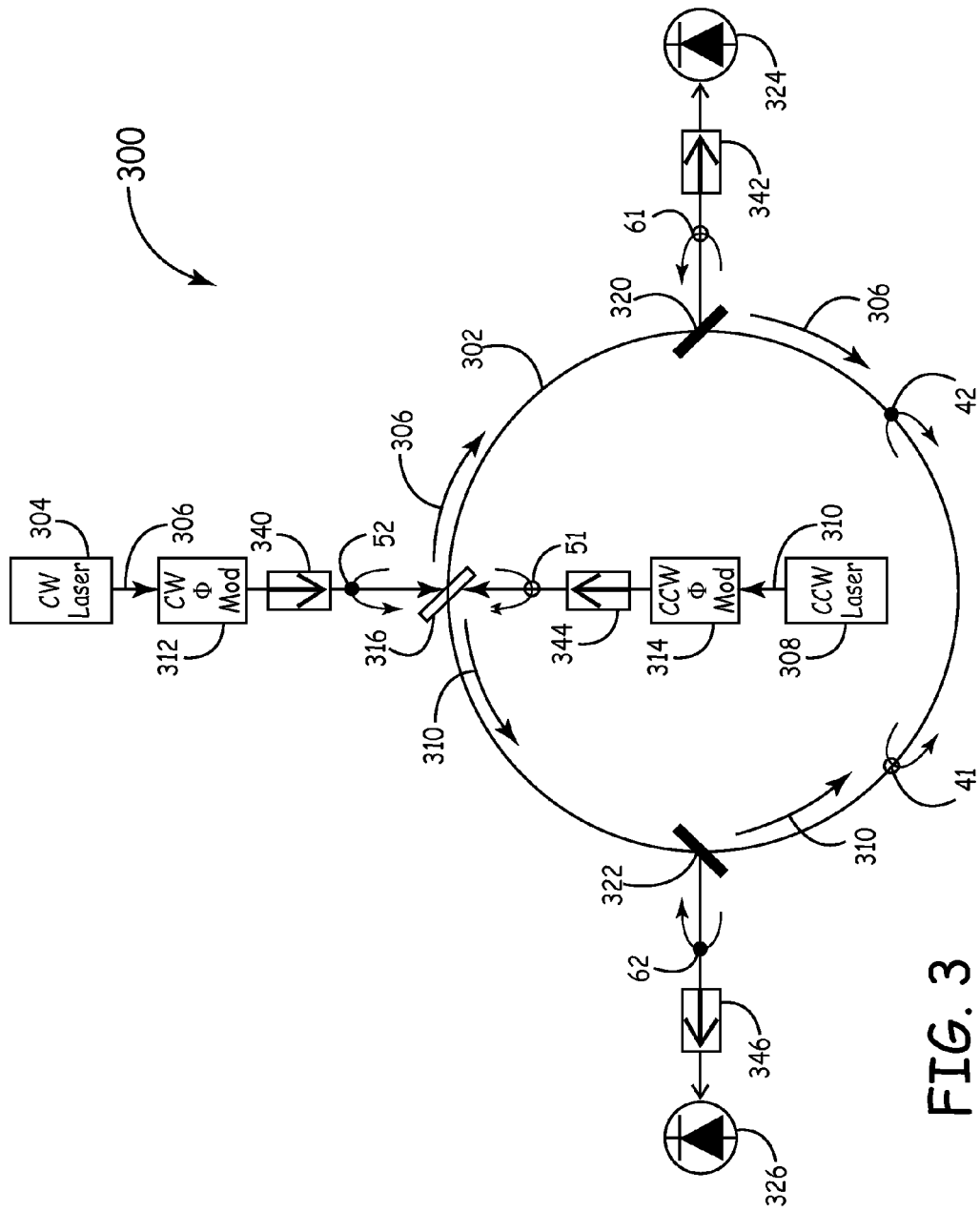
FIG. 3 is a block diagram of an RFOG according to an alternative embodiment.

FIG. 3 depicts an RFOG 300 according to an alternative embodiment, which includes similar components as RFOG 200, including an optical ring cavity 302. A laser 304 generates a CW lightwave 306. A laser 308 generates a CCW lightwave 310. An optical phase modulator 312 is configured to modulate CW lightwave 306, and an optical phase modulator 314 is configured to modulate CCW lightwave 310.

The RFOG 300 has a single optical input coupler 316 to couple both CW and CCW light into ring cavity 302. An optical output coupler 320 is configured to couple the CW lightwave out of ring cavity 202 to an optical detector 324. An optical output coupler 322 is configured to couple the CCW lightwave out of ring cavity 302 to an optical detector 326.

An optical isolator 344 prevents light from being back-reflected to laser 308, and an optical isolator 342 prevents light from being back-reflected to ring cavity 302 for the CW light. Likewise, an optical isolator 340 prevents light from being back-reflected to laser 304, and an optical isolator 346 prevents light from being back-reflected to optical cavity 301 for the CCW light. The RFOG 300 can also comprise additional electronics devices such as those described previously for RFOG 100.

Figure 4:
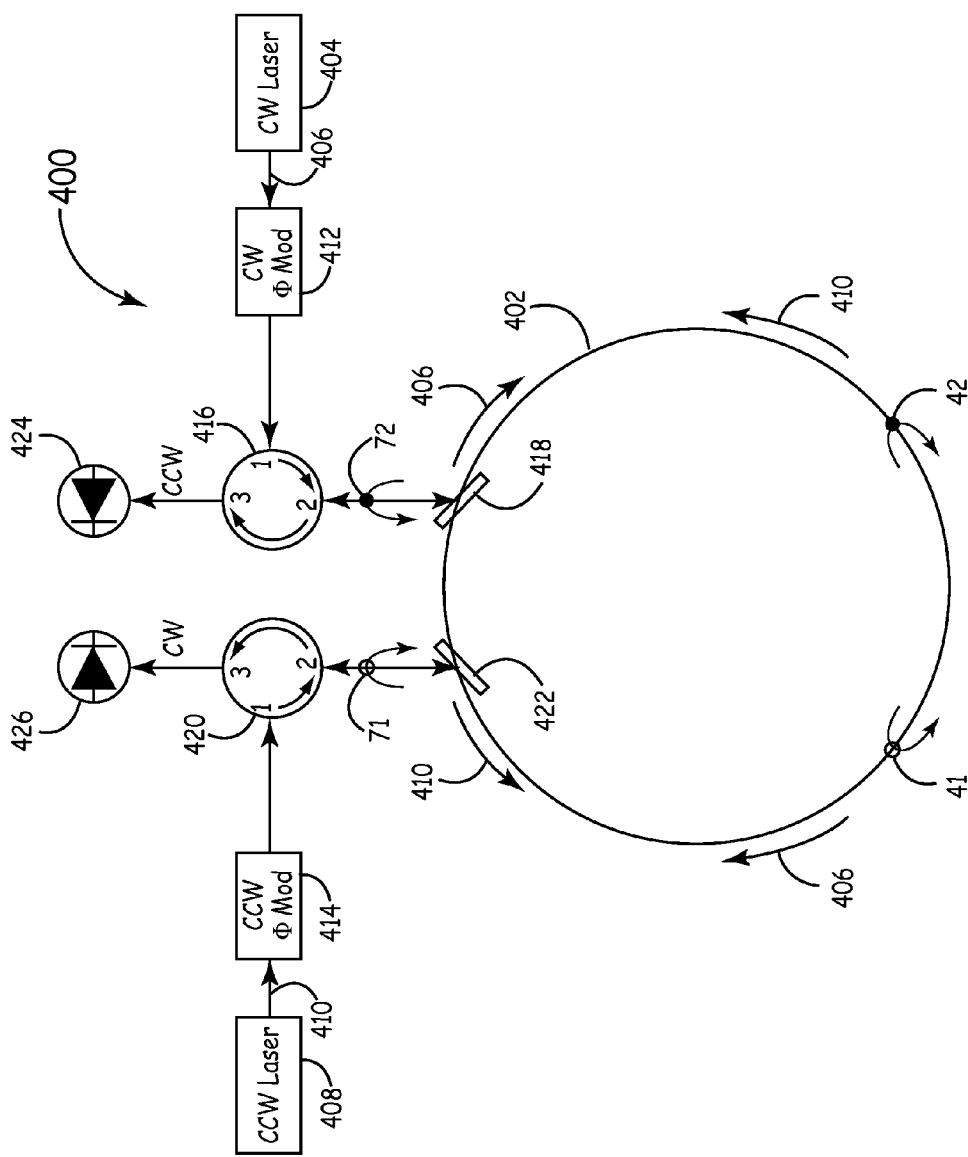
FIG. 4 is a block diagram of an RFOG according to an additional embodiment.

FIG. 4 illustrates an RFOG 400 according to a further embodiment. The RFOG 400 includes an optical ring cavity 402, a laser 404 that generates a CW lightwave 406, and a laser 408 that generates a CCW lightwave 410. An optical phase modulator 412 is configured to modulate CW lightwave 406, and an optical phase modulator 414 is configured to modulate CCW lightwave 410.

As shown in FIG. 4, a first directional optical component 416, such as an optical circulator, is configured to direct CW lightwave 406 from laser 404 to ring cavity 402. A first optical coupler 418 is configured to couple CW lightwave 406 received from optical component 416 into ring cavity 402. A second directional optical component 420 is configured to direct CCW lightwave 410 from laser 408 to ring cavity 402. A second optical coupler 422 is configured to couple CCW lightwave 410 received from optical component 420 into ring cavity 402.

The optical coupler 418 is also configured to couple CCW lightwave 410 from ring cavity 402 to optical component 416, which in turn directs the CCW lightwave to an optical detector 424. The optical coupler 422 is also configured to couple CW lightwave 406 from ring cavity 402 to optical component 420, which in turn directs the CW lightwave to an optical detector 426.

When the directional optical components 416, 420 are implemented as optical circulators, the light propagates in only one direction through the circulator. For example, as shown in FIG. 4, the optical circulators (416, 420) allow light to propagate from port 1 to port 2, and from port 2 to port 3. All other propagation directions (e.g., from port 3 to port 2, from port 2 to port 1, and from port 3 to port 1) are substantially blocked or attenuated. The optical circulators also prevent light from being back-reflected to the optical cavity or lasers.

Returning to FIG. 1, the reflection points shown for RFOG 100 are generally assumed to reflect lightwaves from only one direction (either CW or CCW). In other configurations, a signal reflection point may be able to reflect both CW and CCW lightwaves, such as at point 40 in RFOG 200 shown in FIG. 2. Such reflection points can be considered as two reflection points that overlap in position with each other. Any pair of reflection points that include one open circle reflection point and one filled circle reflection point (or a single point that reflects light in both directions), as depicted in FIGS. 1-4, can cause double-back-reflection type of rotation rate errors.

In order to illustrate a double-reflection configuration example, it can be assumed that points 61 and 42 in FIG. 1 form such a pair for a double reflection case. Light emitted from laser 104 is coupled into ring cavity 102 in the CW direction. The light circulates in ring cavity 102 and is coupled out by output coupler 120 to reach detector 124. The light encounters the first back reflection point 61 and a small fraction of the light is coupled back to ring cavity 102 in the CCW direction because of the bidirectional nature of coupler 120. This reflected light circulates in the CCW direction and a fraction of it is reflected by point 42 back into the CW direction. This double-reflected beam is coupled out of ring cavity 102 to detector 124 along with the CW main signal beam 106. Interference between the two beams causes signal fluctuations for sensing the CW resonance frequency.

A similar analysis shows that the same pair of reflection points (such as 61 and 42) also causes signal fluctuations for sensing the CCW resonance frequency. Error in the net resonance frequency difference of the CW and CCW direction determines the absolute rotation rate error cause by the double reflection. The rotation rate errors of the individual CW and CCW directions can be canceled, which produces a much smaller net rotation rate error from the RFOG output. A theoretical analysis for methods to effectively cancel CW and CCW rotation rate errors is described hereafter.

There are several exemplary configurations that can form a double reflection case. For example, in a first configuration, both reflection points are in the ring cavity (e.g., points 41 and 42 in FIG. 1). In a second configuration, one reflection point is in the ring cavity and the other point is on either input or output beam path (e.g., points 51 and 42, points 61 and 42, points 41 and 52, and points 41 and 62). In a third configuration, both reflection points are outside of the ring cavity (e.g., points 51 and 52, points 51 and 62, points 61 and 52, and points 61 and 62).

Due to the presence of optical isolators or circulators in the optical path, the reflection points outside the ring cavity are assumed to exist only between the input/output couplers and the isolators/circulators in all the embodiments shown in FIGS. 1-4. Reflections from other points outside the ring cavity are substantially attenuated by the isolators or circulators.

In a practical situation, multiple reflection points exist and form multiple double reflection configurations. The theoretical analysis of such a practical situation can be very complicated. In the following, cases containing only two reflection points are treated for simplicity and conclusions from the analysis are used to justify the present inventive embodiments. However, it is to be understood that methods and embodiments may be utilized for more complicated reflection configurations.

For simplifying the descriptions in the following theoretical analysis, alphabet letters are used to label positions in the optical path in FIG. 1. All the CW light input/output coupling points are labeled with a "1" and CCW points with a "2" and follow an alphabet letter in FIG. 1. For example, CW (CCW) input light starts at point A1 (A2), is coupled into the resonator at point B1 (B2), is coupled out of the resonator at point C1 (C2), and reaches the detector D1 (D2). The first reflection point for the CW light is labeled by letter "P" and the second reflection point is labeled by letter "Q". For the CCW beam, the first reflection point is "Q" and the second is "P". Specifically, "P" and "Q" in FIG. 1 show a double reflection of the first configuration when both reflection points are inside the ring cavity at points 41 and 42.

Each double-reflection optical path for a specific configuration can be described by a series of points on the path connected by arrows that indicate directions of light propagation. For example, the double-reflected CW and CCW light in the first configuration shown in FIG. 1 can be expressed by:

CW:

$$A1 \xrightarrow{In} B1 \xrightarrow{+} P \xrightarrow{+l} P \xrightarrow{-} Q \xrightarrow{-m} \quad (1)$$
$$Q \xrightarrow{+} C1 \xrightarrow{+n} C1 \xrightarrow{Out} D1 \quad \text{and}$$

CCW:

$$A2 \xrightarrow{In} B2 \xrightarrow{-} Q \xrightarrow{-l} Q \xrightarrow{+} P \xrightarrow{+m} \quad (2)$$
$$P \xrightarrow{-} C2 \xrightarrow{-n} C2 \xrightarrow{Out} D2$$

In the above expressions (1) and (2), light propagating from one point to another is indicated by an arrow. The "+" sign and "−" sign above the arrows indicates the CW and CCW direction, respectively. When there is an integer number m,l,n on the right side of the "+" or "−" sign above the arrow, it means light circulates in the indicated direction by an integer number of turns. A "In" or "Out" above the arrow indicates if the light is on an input or output path.

For example expression (1) can be interpreted as: CW light inputs from A1 to B1, propagates in the CW direction from B1 to P, then circulates in the CW direction for l turns and returns to the point P, then is reflected by P and propagates from P to Q in the CCW direction, then circulates in the CCW direction for m turns and returns to Q, then is reflected by Q and propagates in the CW direction from Q to C1, then circulates in the CW direction for n turns and returns to C1, and at last is coupled out of the resonator to the detector D1. The m,l,n can be any non-negative integer numbers for description of a specific optical path involving double reflections. A zero integer number means light is not circulated in the ring cavity.

Due to the circulating nature of the RFOG ring cavity, many lightwave fields (either back-reflected or not) that experienced different numbers of round-trips in the resonator overlap at the photodetector. Using Jones matrix notations to describe the lightwave propagation, the summation of all the double-reflected CW light fields at the detector can be expressed by the following equation:

$$E_{CW\_2R} = \sum_{l,m,n=0}^{\infty} M_{C1D1} \cdot M_{C1}^{+n} \cdot M_{QC1}^{+} \cdot M_{Q}^{-m} \cdot M_{PQ}^{-} \cdot M_{P}^{+l} \cdot M_{B1P}^{+} \cdot M_{A1B1} \cdot E_{in} \quad (3)$$

where, for example, Jones matrix $M_{A1B1}$ describes propagation from point A1 to B1, and matrix $M_Q^{-m}$ describes circulation of light in the CCW direction from point Q to point Q. These Jones matrices describe the polarization cross-coupling, the loss, and the birefringence properties of the optical path. If only one polarization mode is assumed here for simplicity, all the matrices can be reduced to complex numbers and the above equation is rearranged into a form of:

$$E_{CW\_2R} = \sum_{n=0}^{\infty}\sum_{m=0}^{\infty}\sum_{l=0}^{\infty} (M_{C1}^{+n} \cdot M_Q^{-m} \cdot M_P^{+l}) \cdot \quad (4)$$

$$(M_{C1D1} \cdot M_{QC1}^{+} \cdot M_{PQ}^{-} \cdot M_{B1P}^{+} \cdot M_{A1B1}) \cdot E_{in}$$

$$= \kappa E_{in} \sum_{n=0}^{\infty}\sum_{m=0}^{\infty}\sum_{l=0}^{\infty} \lambda^{l+n+m} e^{i(l+n-m)\phi_S}$$

$$= \kappa E_{in} \left(\frac{1}{1-\lambda e^{i\phi_S}}\right)^2 \left(\frac{1}{1-\lambda e^{-i\phi_S}}\right)$$

Here $\kappa$ is the transmission coefficient from the input to the output through double reflection without including one or more round trips (i.e., $\kappa$ is the value of the right parenthesis), $\lambda$ is the ring cavity round trip amplitude transmission coefficients, and $\phi_S$ is the Sagnac phase due to non-zero rotation rate.

The main signal (without double reflections) is expressed as:

$$E_{CW\_m} = \sum_{q=0}^{+\infty} (\lambda e^{i\phi_S})^q \chi E_{in} = \frac{\chi E_{in}}{1-\lambda e^{i\phi_S}}, \quad (5)$$

where $\chi$ is the transmission coefficient from the input to the output port without any reflections. Interference of the double-reflected CW light field $E_{CW\_2R}$ with the main signal field $E_{CW\_m}$ is the major contributor to the CW rotation rate error. To calculate this rotation rate error, modulation and demodulation of the signal have to be taken into account by the model. After sinusoidal phase modulation with angular frequency of $\omega_m$ and phase amplitude of M radians, the v-harmonic frequency component of the main signal light field at the detector is given by:

$$E_{v\_m} = J_v(M)e^{i(\omega_c+v\omega_m)t} \frac{\chi}{1-\eta e^{i\phi_S}e^{-i(\omega_c+v\omega_m)\tau}e^{-2\pi\Delta f\tau}}, \quad (6)$$

where $J_v$ is the v-order Bessel function of the first kind, $\omega_c$ is the central angular frequency of the laser beam, $\eta$ is the ring cavity round-trip transmission coefficient, $\Delta f$ is the laser linewidth in Hz, and $\tau$ is the ring cavity round-trip time. Similarly, The w-harmonic frequency component of the double reflected field at the detector can be expressed by:

$$E_{w\_2R} = J_w(M)e^{i(\omega_c+w\omega_m)t} \kappa \left(\frac{1}{1-\eta e^{i\phi_S}e^{-i(\omega_c+w\omega_m)\tau}e^{-2\pi\Delta f\tau}}\right)^2 \quad (7)$$

$$\left(\frac{1}{1-\eta e^{-i\phi_S}e^{-i(\omega_c+w\omega_m)\tau}e^{-2\pi\Delta f\tau}}\right)$$

The main signal intensity at angular frequency $(w-v)\omega_m$ due to beat between the w and v frequency component of the main signal is derived as:

$$B_{wv\_m} = J_w J_v^* e^{i(w-v)\omega_m t} \left(\frac{\chi}{1-\eta e^{i\phi_S}e^{-i(\omega_c+w\omega_m)\tau}e^{-2\pi\Delta f\tau}}\right) \quad (8)$$

$$\left(\frac{\chi^*}{1-\eta^* e^{-i\phi_S}e^{i(\omega_c+v\omega_m)\tau}e^{-2\pi\Delta f\tau}}\right)$$

$$= J_w J_v^* e^{i(w-v)\omega_m t} Z_{wv\_m}$$

The reflection induced error signal intensity at frequency $(w-v)\omega_m$ due to beat between $E_{w\_2R}$ and $E_{v\_m}$ is:

$$B_{wv\_r} = J_w J_v^* e^{i(w-v)\omega_m t} \left[\frac{\chi^*}{1-\eta^* e^{-i\phi_S}e^{i(\omega_c+v\omega_m)\tau}e^{-2\pi\Delta f\tau}}\right] \cdot \quad (9)$$

$$\kappa\left(\frac{1}{1-\eta e^{i\phi_S}e^{-i(\omega_c+w\omega_m)\tau}e^{-2\pi\Delta f\tau}}\right)^2$$

$$\left(\frac{1}{1-\eta e^{-i\phi_S}e^{-i(\omega_c+w\omega_m)\tau}e^{-2\pi\Delta f\tau}}\right)$$

$$= J_w J_v^* e^{i(w-v)\omega_m t} Z_{wv\_r}$$

where $Z_{wv\_m}$ and $Z_{wv\_r}$ are used to simplify equations (8) and (9), respectively, in the last step. Summation over all the possible terms that satisfy the w−v=1 condition produces the final main signal at modulation frequency $\Omega_m$:

$$I_m(\omega_m) = \sum_{w=v+1=-\infty}^{\infty} J_w J_v^* e^{i(w-v)\omega_m t} Z_{wv\_m} + c.c. \quad (10)$$

$$= 2\sum_{w=v+1=-\infty}^{\infty} \begin{bmatrix} \cos(\omega_m t)\mathrm{Re}(J_w J_v^* Z_{wv\_m}) - \\ \sin(\omega_m t)\mathrm{Im}(J_w J_v^* Z_{wv\_m}) \end{bmatrix}$$

The double reflection induced error signal at $\omega_m$ can be similarly calculated as:

$$I_r(\omega_m) = 2\sum_{w=v+1=-\infty}^{\infty} [\cos(\omega_m t)\mathrm{Re}(J_w J_v^* Z_{wv\_r}) - \sin(\omega_m t)\mathrm{Im}(J_w J_v^* Z_{wv\_r})] \quad (11)$$

The total demodulated in-phase and quadrature signals are contained in the expression of $I(\omega_m)=I_m(\omega_m)+I_r(\omega_m)$ for calculation of rotation rate error. The CW and CCW rotation rate errors can be calculated in the same way described above and the net rotation rate error is obtained by subtracting one from the other.

Using the mathematical equations derived above, it is possible to quantify the RFOG rotation rate errors induced by double reflections. FIG. 5A is a graph showing an example of a demodulated main signal, calculated with equation (10), as a function of laser frequency deviation from cavity resonance frequency in units of free spectral range. Ideally, that is, without any double reflections, the main signal is zero when the laser frequency is tuned to the resonance center. With the presence of double reflections in the ring cavity, there are nonzero demodulated error signals, calculated with equation (11), at the resonance center as shown in the graphs of FIGS. 5B, 5C, and 5D. This error signal is unstable, changing its sign and magnitude upon relative phase changes between the main and error lightwaves. Fiber length change (e.g., caused by temperature fluctuations) will lead to relative phase changes between the main signal wave and the reflected error wave. FIGS. 5B, 5C, and 5D show exemplarily error signals at three different relative phases (0°, 90°, and 150°), indicating instability caused by double reflections.

Figure 6B:
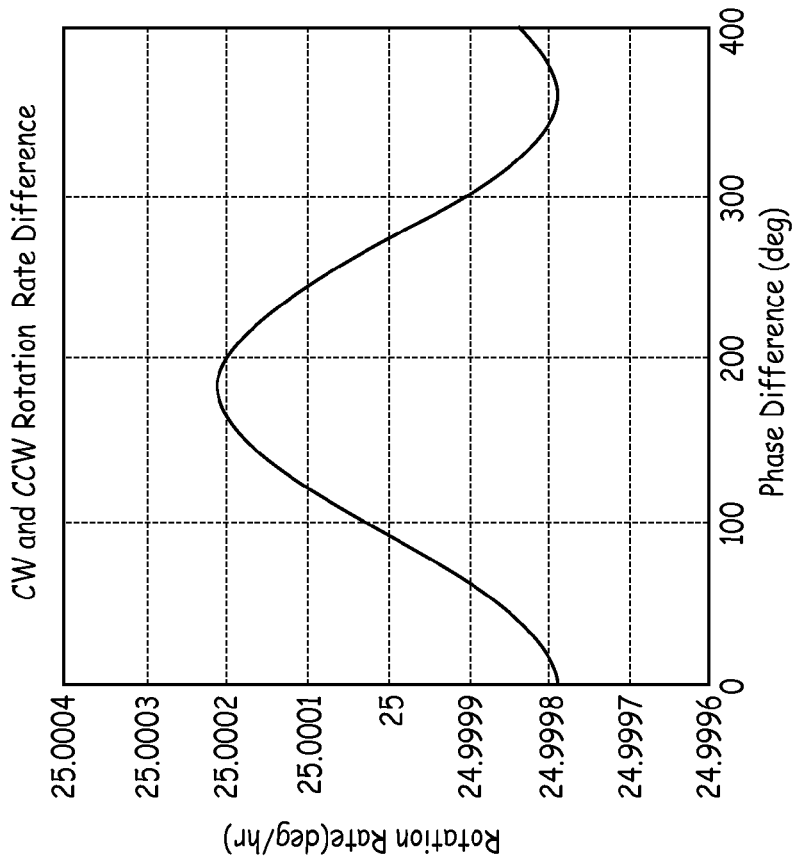
FIG. 6B is a graph plotting the CW and CCW rotation rate difference after subtraction of the CW and CCW signals in FIG. 6A.
Figure 6A:
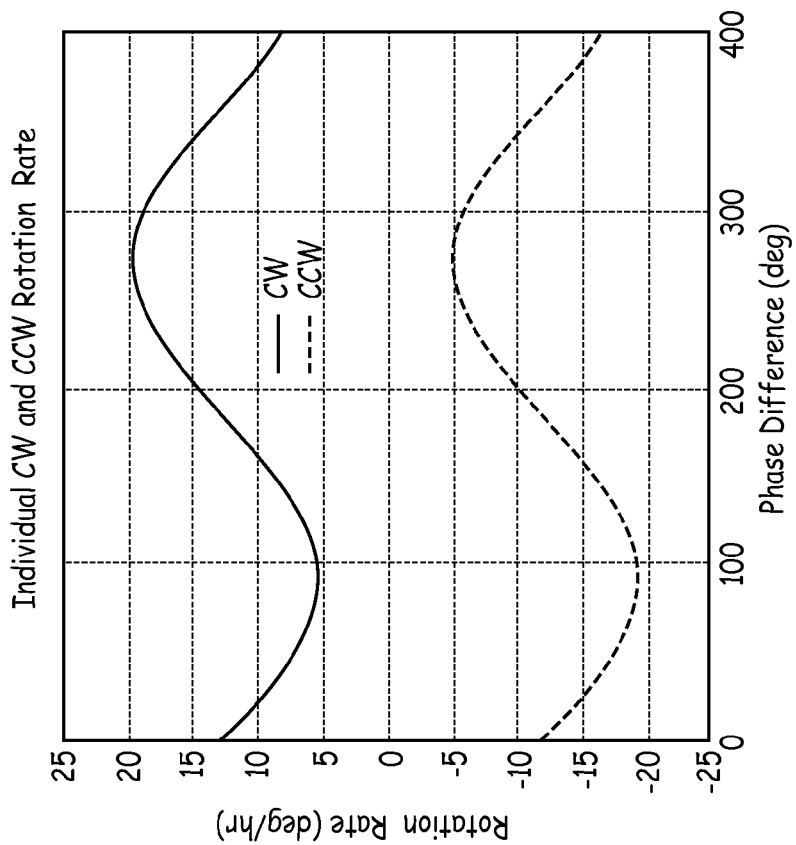
FIG. 6A is a graph plotting individual clockwise (CW) and counter-clockwise (CCW) rotation rate fluctuations as a function of relative phase change between a main signal and reflected error signals in an RFOG.

Large signal fluctuations of individual beams of CW and CCW may not necessarily mean large fluctuations of the measured rotation rate. If the RFOG has high symmetry with regard to CW and CCW resonance frequency measurement, that is, high symmetry of the ring cavity, identical properties of the CW and CCW light beam and phase modulation, etc., the net rotation rate error can be very small because of the cancellation effect of CW and CCW rotation rate error. The graph of FIG. 6A plots individual CW and CCW rotation rate error fluctuations as a function of relative phase change (between the main and the reflected error lightwaves) when the gyroscope is rotating at an exemplary rate of 25°/hr. Each of the CW and CCW signals exhibits large rotation rate error fluctuations (~15°/hr peak-to-peak) due to the presence of double reflection in the ring cavity. However, after subtraction of the CW and CCW signal, the measured rotation rate has a very small rotation rate error (0.0004°/hr peak-to-peak) as shown in FIG. 6B due to perfect symmetry between CW and CCW. The residual small rotation rate error fluctuation shown in FIG. 6B is caused by non-zero rotation induced asymmetry for propagation of reflected lightwaves in CW and CCW directions. If the rotation rate is zero, this residual rotation rate error fluctuation will vanish.

Figure 7A:
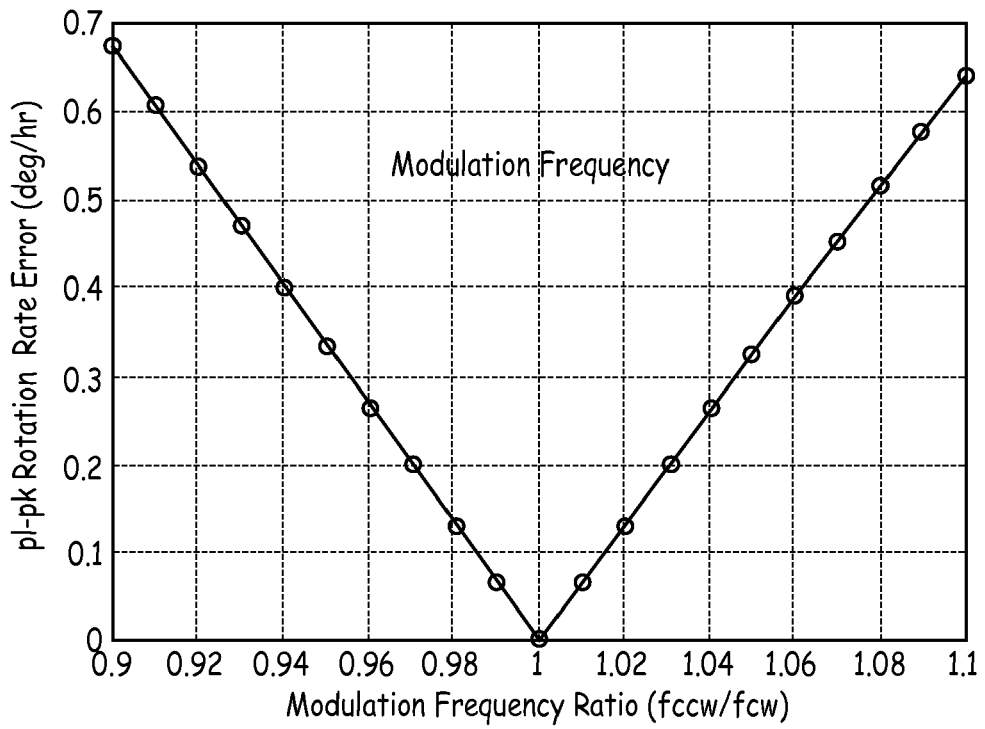
FIG. 7A is a graph showing the dependence of peak-to-peak net rotation rate fluctuations as a function of the ratio of CCW to CW phase modulation frequency in an RFOG.
Figure 7B:
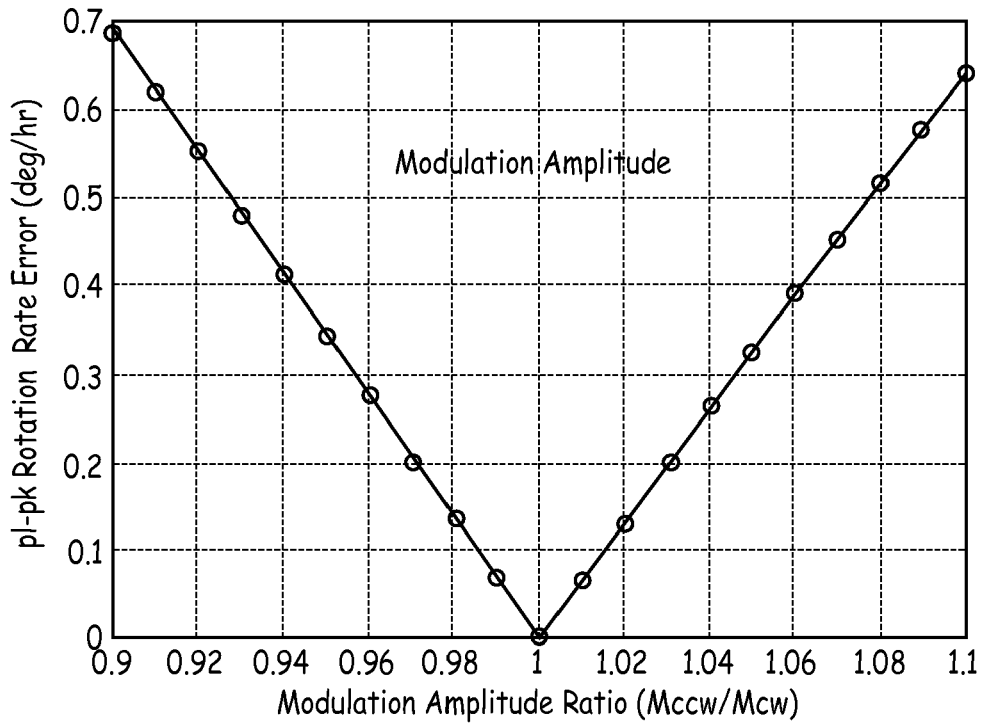
FIG. 7B is a graph showing the dependence of peak-to-peak net rotation rate fluctuations as a function of the ratio of CCW to CW phase modulation amplitude in an RFOG.

To further illustrate the cancellation effect of double reflection type rotation rate error of a symmetric RFOG, the graph of FIG. 7A shows the dependence of peak-to-peak net rotation rate error fluctuations as a function of the ratio of CCW to CW phase modulation frequency when all other CW and CCW parameters are identical. It is clear that effective cancellation happens when CW and CCW phase modulation frequency is identical (indicated by a ratio of 1 in the center of FIG. 7A). The graph of FIG. 7B shows a similar dependence of peak-to-peak rotation rate error on CCW to CW phase modulation amplitude ratio. Perfect rotation rate error cancellation can be achieved when CW and CCW modulation frequency and amplitude are identical.

Figure 8:
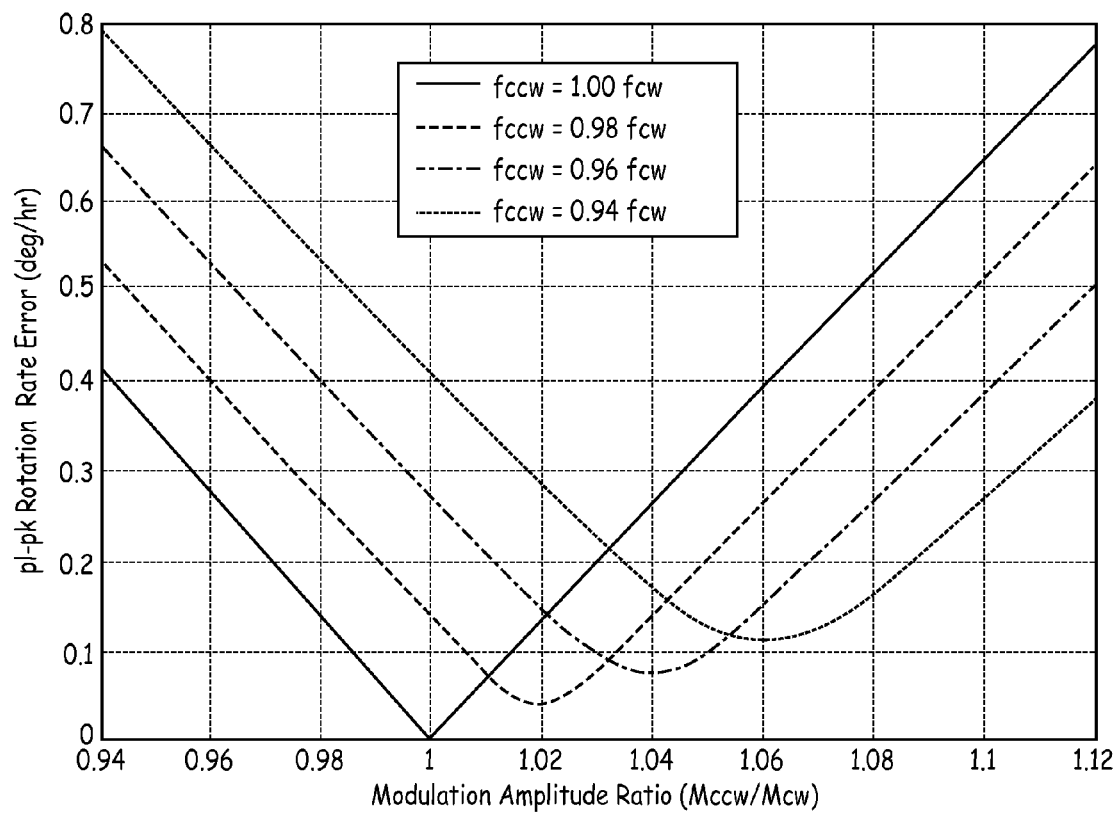
FIG. 8 is a graph of the simulation results for cancellation of rotation rate errors by adjusting the modulation amplitude when CW and CCW modulation frequencies are potentially different in an RFOG.

The graph of FIG. 8 shows the simulation results for cancellation of rotation rate errors by adjusting the modulation amplitude when CW and CCW modulation frequencies are potentially different. Although a minimum peak-to-peak rotation rate error can be obtained with modulation amplitude ratio away from 1 for non-identical modulation frequencies, the residual rotation rate errors are significantly higher than the perfect cancellation case (when both modulation frequency and modulation amplitude are identical).

Figure 9:
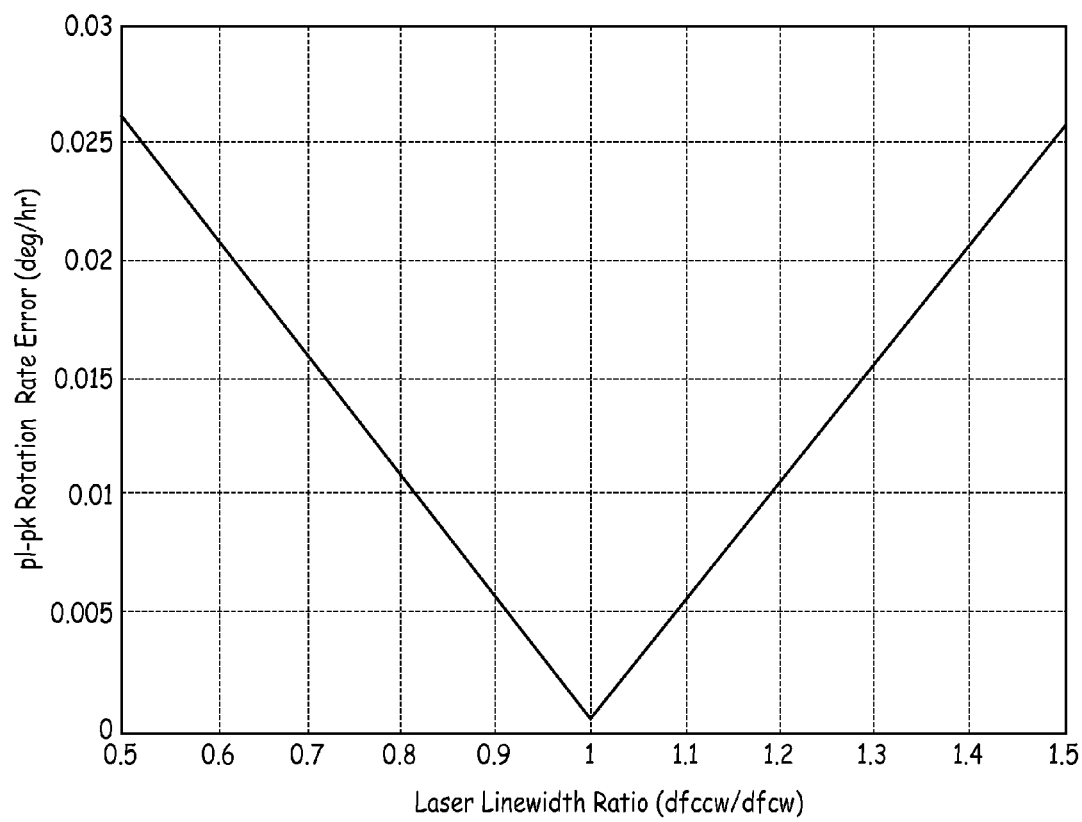
FIG. 9 is graph showing the dependence of rotation rate error as a function of CCW to CW laser linewidth ratio in an RFOG.

Besides phase modulation frequency and modulation amplitude, other light beam properties may affect the rotation rate errors cancellation effect. For example, the linewidth difference between the CW and CCW light can cause imperfect cancellation of rotation rate errors. The dependence of rotation rate errors as a function of CCW to CW laser linewidth is plotted in the graph of FIG. 9. Excellent cancellation happens when CW and CCW laser has identical linewidth. However, by comparing FIG. 9 with FIGS. 7A and 7B, it is clear that the sensitivity of effective rotation rate errors cancellation to laser line width difference is much smaller than to the modulation frequency/amplitude difference. A 10% difference of CW and CCW laser linewidth causes peak-to-peak rotation rate error of 0.005°/hr, while a 10% difference of modulation frequency/amplitude difference can cause more than 0.7°/hr rotation rate error.

Figure 10:
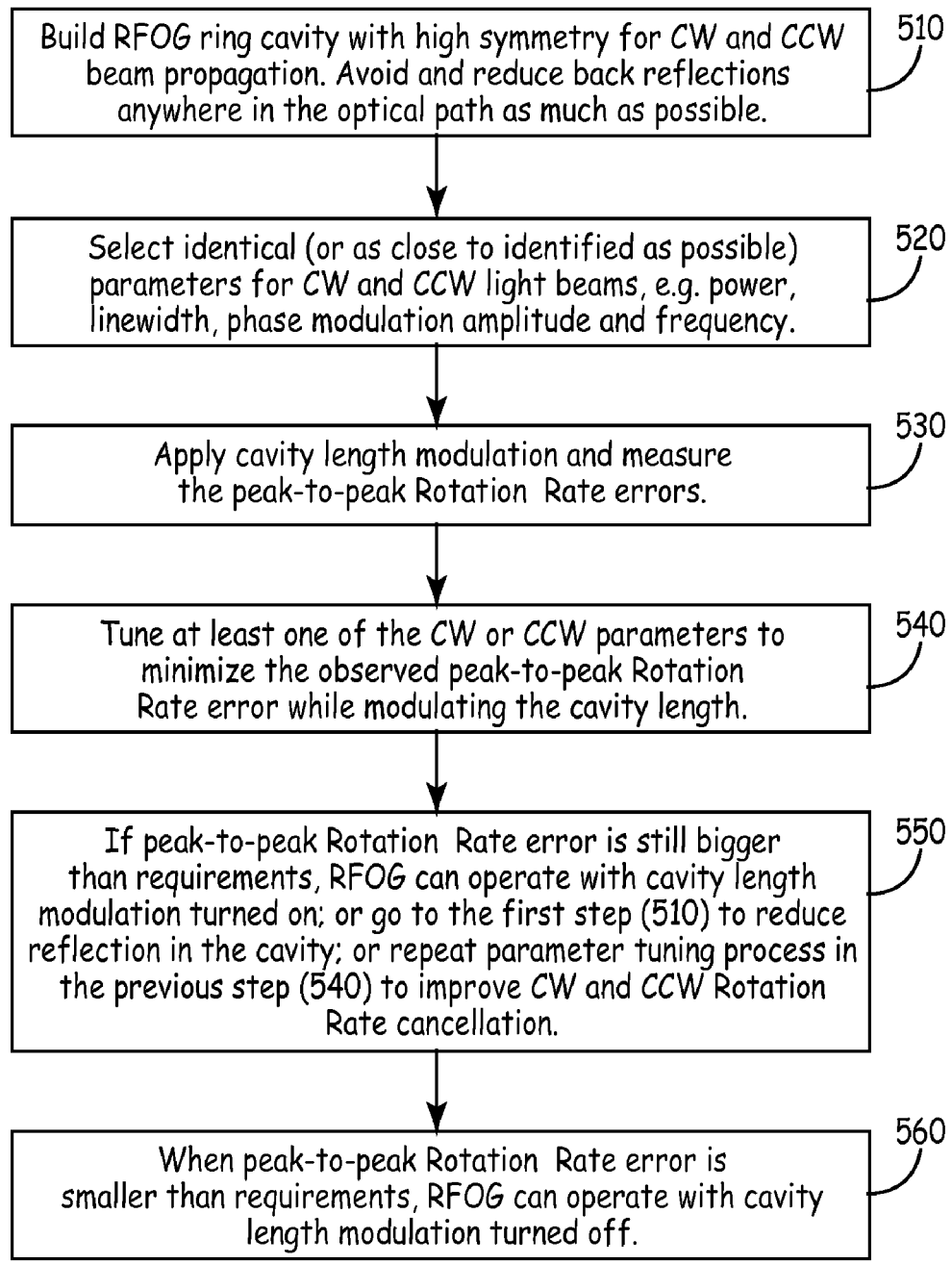
FIG. 10 is a flow diagram of an exemplary method for canceling double reflection induced rotation rate errors in an RFOG.

The analysis and modeling described above provide for effective methods to cancel double reflection induced rotation rate errors. FIG. 10 is a flow diagram showing such an exemplary method. Initially, an RFOG ring cavity is built with high symmetry for CW and CCW beam propagation (block 510). Care must be paid to avoid and reduce back reflections anywhere in the optical path as much as possible. Next, identical (or nearly identical) parameters are selected for CW and CCW light beams (block 520), such as laser linewidth, power, phase modulation amplitude and frequency, etc. in order to improve the rotation rate error cancellation effect. In the next step, cavity length modulation is applied to the RFOG in order to measure peak-to-peak rotation rate errors (block 530). These rotation rate errors are used in the next step to tune at least one of the CW or CCW parameters to minimize the observed peak-to-peak rotation rate error while modulating the cavity length (block 540). If the peak-to-peak rotation rate error is still bigger than requirements, the RFOG can continue to operate with cavity length modulation turned on (block 550). For example, if the peak-to-peak rotation rate errors are larger than a predetermined threshold, cavity length modulation can be applied to remove rotation rate errors through averaging.

It may be necessary to go back to the first step (block 510) to reduce reflection in the cavity, or repeat the parameter tuning process (block 540) in order to improve CW and CCW rotation rate error cancellation. Once the peak-to-peak rotation rate errors are controlled within the specifications in the previous steps, such as the rotation rater error being smaller than requirements, the cavity length modulation of the RFOG can be turned off (block 560), or removed from the gyroscope to reduce component and operation cost.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A resonator fiber optic gyroscope, comprising:
    a resonator optical ring cavity;
    a first light source in optical communication with the ring cavity and configured to generate a clockwise optical signal that is transmitted to the ring cavity;
    a second light source in optical communication with the ring cavity and configured to generate a counter-clockwise optical signal that is transmitted to the ring cavity;
    a first optical isolator in optical communication with the first light source and the ring cavity, the first optical isolator configured to prevent the clockwise optical signal from being back-reflected to the first light source;
    a second optical isolator in optical communication with the second light source and the ring cavity, the second optical isolator configured to prevent the counter-clockwise optical signal from being back-reflected to the second light source;
    a first optical detector optically coupled to the ring cavity;
    a second optical detector optically coupled to the ring cavity;
    a third optical isolator optically coupled between the ring cavity and the first optical detector, the third optical isolator configured to prevent the clockwise optical signal from being back-reflected to the ring cavity; and
    a fourth optical isolator optically coupled between the ring cavity the second optical detector, the fourth optical isolator configured to prevent the counter-clockwise optical signal from being back-reflected to the ring cavity.

2. The resonator fiber optic gyroscope of claim 1, wherein the first and second light sources each comprise at least a laser.

3. The resonator fiber optic gyroscope of claim 1, further comprising a first optical phase modulator located between the first light source and the ring cavity, the first optical phase modulator configured to modulate the clockwise optical signal.

4. The resonator fiber optic gyroscope of claim 3, further comprising a second optical phase modulator located between the second light source and the ring cavity, the second optical phase modulator configured to modulate the counter-clockwise optical signal.

5. The resonator fiber optic gyroscope of claim 1, further comprising:
   a first input coupler configured to couple the clockwise optical signal from the first light source into the ring cavity;
   a second input coupler configured to couple the counter-clockwise optical signal from the second light source into the ring cavity;
   a first output coupler configured to couple the clockwise optical signal from the ring cavity to the first optical detector; and
   a second output coupler configured to couple the counter-clockwise optical signal from the ring cavity to the second optical detector.

6. The resonator fiber optic gyroscope of claim 5, wherein:
   the third optical isolator is located between the first output coupler and the first optical detector; and
   the fourth optical isolator is located between the second output coupler and the second optical detector.

7. The resonator fiber optic gyroscope of claim 1, further comprising:
   a first input coupler configured to couple the clockwise optical signal from the first light source into the ring cavity;
   a second input coupler configured to couple the counter-clockwise optical signal from the second light source into the ring cavity; and
   an output coupler configured to couple the clockwise optical signal from the ring cavity to the first optical detector, and to couple the counter-clockwise optical signal from the ring cavity to the second optical detector.

8. The resonator fiber optic gyroscope of claim 7, wherein:
   the third optical isolator is located between the output coupler and the first optical detector; and
   the fourth optical isolator is located between the output coupler and the second optical detector.

9. The resonator fiber optic gyroscope of claim 1, further comprising:
   an input coupler configured to couple the clockwise optical signal from the first light source into the ring cavity, and to couple the counter-clockwise optical signal from the second light source into the ring cavity;
   a first output coupler configured to couple the clockwise optical signal from the ring cavity to the first optical detector; and
   a second output coupler configured to couple the counter-clockwise optical signal from the ring cavity to the second optical detector.

10. The resonator fiber optic gyroscope of claim 9, wherein:
    the third optical isolator is located between the first output coupler and the first optical detector; and
    the fourth optical isolator is located between the second output coupler and the second optical detector.

11. A resonator fiber optic gyroscope, comprising:
    a resonator optical ring cavity;
    a first laser device in optical communication with the ring cavity and configured to generate a clockwise optical signal that is transmitted to the ring cavity;
    a second laser device in optical communication with the ring cavity and configured to generate a counter-clockwise optical signal that is transmitted to the ring cavity;
    a first optical detector optically coupled to the ring cavity and configured to receive the clockwise optical signal;
    a second optical detector optically coupled to the ring cavity and configured to receive the counter-clockwise optical signal;
    a first optical circulator configured to direct the clockwise optical signal from the first laser device to the ring cavity, and to direct the counter-clockwise optical signal from the ring cavity to the first optical detector; and
    a second optical circulator configured to direct the counter-clockwise optical signal from the second laser device to the ring cavity, and to direct the clockwise optical signal from the ring cavity to the second optical detector;
    wherein the first optical circulator is configured to prevent the clockwise optical signal from being back-reflected to the first laser device and the ring cavity, and the second optical circulator is configured to prevent the counter-clockwise optical signal from being back-reflected to the second laser device and the ring cavity.

12. The resonator fiber optic gyroscope of claim 11, further comprising:
    a first optical coupler configured to couple the clockwise optical signal from the first optical circulator into the ring cavity, and to couple the counter-clockwise optical signal from the ring cavity to the first optical circulator; and
    a second optical coupler configured to couple the counter-clockwise optical signal from the second optical circulator into the ring cavity, and to couple the clockwise optical signal from the ring cavity to the second optical circulator.

13. A resonator fiber optic gyroscope, comprising:
    a resonator optical ring cavity;
    a first laser device in optical communication with the ring cavity and configured to generate a clockwise optical signal that is transmitted to the ring cavity;
    a second laser device in optical communication with the ring cavity and configured to generate a counter-clockwise optical signal that is transmitted to the ring cavity;
    a first optical detector optically coupled to the ring cavity and configured to receive the clockwise optical signal;
    a second optical detector optically coupled to the ring cavity and configured to receive the counter-clockwise optical signal;
    a first optical isolator optically coupled between the ring cavity and the first optical detector, the first optical isolator configured to prevent the clockwise optical signal from being back-reflected to the ring cavity; and
    a second optical isolator optically coupled between the ring cavity the second optical detector, the second optical isolator configured to prevent the counter-clockwise optical signal from being back-reflected to the ring cavity.

* * * * *